US010392075B2

(12) United States Patent
Otsuki et al.

(10) Patent No.: US 10,392,075 B2
(45) Date of Patent: *Aug. 27, 2019

(54) INVERTED PENDULUM TYPE VEHICLE AND ANKLE TORQUE ESTIMATION METHOD (71) Applicant: TOYOTA JIDOSHA KABUSHIKI KAISHA, Toyota-shi, Aichi-ken (JP)

(72) Inventors: Nobuhisa Otsuki, Toyota (JP); Masahiro Takahashi, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 104 days.

This patent is subject to a terminal disclaimer.

(21) Appl. No.: 15/663,925

(22) Filed: Jul. 31, 2017

(65) Prior Publication Data
US 2018/0057099 A1 Mar. 1, 2018

(30) Foreign Application Priority Data

Aug. 23, 2016 (JP) ................................. 2016-162991

(51) Int. Cl.
*B62K 23/08* (2006.01)
*B62K 11/00* (2006.01)
(52) U.S. Cl.
CPC ............ *B62K 23/08* (2013.01); *B62K 11/007* (2016.11); *B62K 2204/00* (2013.01)
(58) Field of Classification Search
CPC ...... B62K 23/02; B62K 23/08; B62K 11/007; B62K 11/2204; B62K 11/00
See application file for complete search history.

(56) References Cited

U.S. PATENT DOCUMENTS

| 2010/0030442 A1 | 2/2010 | Kosaka |
| 2011/0060518 A1 | 3/2011 | Kosaka |
| 2011/0282532 A1 | 11/2011 | Kosaka et al. |
| 2012/0166048 A1* | 6/2012 | Inoue ................... G05D 1/0061 701/49 |
| 2013/0171601 A1 | 7/2013 | Yuasa et al. |
| 2015/0239499 A1* | 8/2015 | Lan ........................... G01L 1/22 701/41 |

(Continued)

FOREIGN PATENT DOCUMENTS

| CN | 102341298 A | 2/2012 |
| CN | 105425802 A | 3/2016 |
| JP | 2004-180982 A | 7/2004 |

(Continued)

OTHER PUBLICATIONS

Communication dated May 8, 2018 from the Japanese Patent Office in application No. 2016-162991.

*Primary Examiner* — Tony H Winner
(74) *Attorney, Agent, or Firm* — Sughrue Mion, PLLC (57) ABSTRACT

Provided is an inverted pendulum type vehicle including a drive wheel and a boarding part on which a rider rides in a standing position, the inverted pendulum type vehicle including: a detection unit configured to detect a drive torque of the drive wheel to maintain an inverted state; and an output unit configured to generate torque information about an ankle torque based on the drive torque detected by the detection unit and output the generated torque information, the ankle torque being applied to the boarding part by the rider.

12 Claims, 11 Drawing Sheets

(56) References Cited

U.S. PATENT DOCUMENTS

2017/0106931 A1* 4/2017 Wood .................. B62K 11/007
2018/0165982 A1* 6/2018 Takahashi ................ A61H 1/02

FOREIGN PATENT DOCUMENTS

| JP | 2006-256401 A | 9/2006 |
| JP | 2010-030436 A | 2/2010 |
| JP | 2011-031669 A | 2/2011 |
| JP | 2011-140262 A | 7/2011 |
| JP | 2012-070802 A | 4/2012 |
| JP | 2012-86683 A | 5/2012 |
| JP | 2016049950 A | 4/2016 |

* cited by examiner

INVERTED PENDULUM TYPE VEHICLE AND ANKLE TORQUE ESTIMATION METHOD

CROSS REFERENCE TO RELATED APPLICATIONS

This application is based upon and claims the benefit of priority from Japanese patent application No. 2016-162991, filed on Aug. 23, 2016, the disclosure of which is incorporated herein in its entirety by reference.

BACKGROUND

The present invention relates to an inverted pendulum type vehicle and an ankle torque estimation method. Among travel devices that detect posture information using a gyroscopic sensor, an acceleration sensor, or the like, and control driving based on the detected posture information, an inverted pendulum type two-wheel vehicle that controls drive wheels by applying an inverted pendulum posture control model is known. For example, Japanese Unexamined Patent Application Publication No. 2010-30436 discloses an inverted pendulum type two-wheel vehicle having a structure in which a rider allows a handle to be tilted to thereby cause the vehicle to move forward or turn.

SUMMARY

The inverted pendulum type two-wheel vehicle can be used not only as a simple tool for travel, but also as a training device like a bicycle. When the inverted pendulum type two-wheel vehicle is used as a training device, it is preferable to be able to objectively observe how much motion load is received by the rider. However, when the motion load is observed, for example, the rider needs to wear a measuring device, which is not convenient for the rider.

The present invention has been made to solve the above-mentioned problem, and an object of the present invention is to enable quantitative observation of an ankle torque of a rider riding, in particular, on an inverted pendulum type vehicle, without the need for the rider to wear a special device such as a sensor.

An inverted pendulum type vehicle according to a first aspect of the present invention is an inverted pendulum type vehicle including a drive wheel and a boarding part on which a rider rides in a standing position, the inverted pendulum type vehicle including: a detection unit configured to detect a drive torque of the drive wheel to maintain an inverted state; and an output unit configured to generate torque information about an ankle torque based on the drive torque detected by the detection unit and output the generated torque information, the ankle torque being applied to the boarding part by the rider.

An ankle torque estimation method according to a second aspect of the present invention is an ankle torque estimation method for estimating an ankle torque of a rider riding on an inverted pendulum type vehicle including a drive wheel and a boarding part on which the rider rides in a standing position, the ankle torque estimation method including: a detection step of detecting a drive torque of the drive wheel to maintain an inverted state; and a generation step of generating an estimated value of the ankle torque by converting the driving torque detected in the detection step.

With the structures according to the above embodiments, when training is performed using an inverted pendulum type vehicle, a rider or an assistant who assists the rider can objectively comprehend a motion load on a rider's ankle, without the need for the rider to wear a special device such as a sensor.

According to the present invention, it is possible to quantitatively observe an ankle torque of a rider riding on an inverted pendulum type vehicle without the rider having to take the time and use the labor to put on a special device, such as a sensor, in advance and without any troublesome operation associated with putting on the special device.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

The present invention will be described below with reference to embodiments of the invention. However, the invention according to the scope of claims is not limited to the following embodiments. All the components described in the embodiments are not necessarily essential as means for solving the problem.

Figure 1:
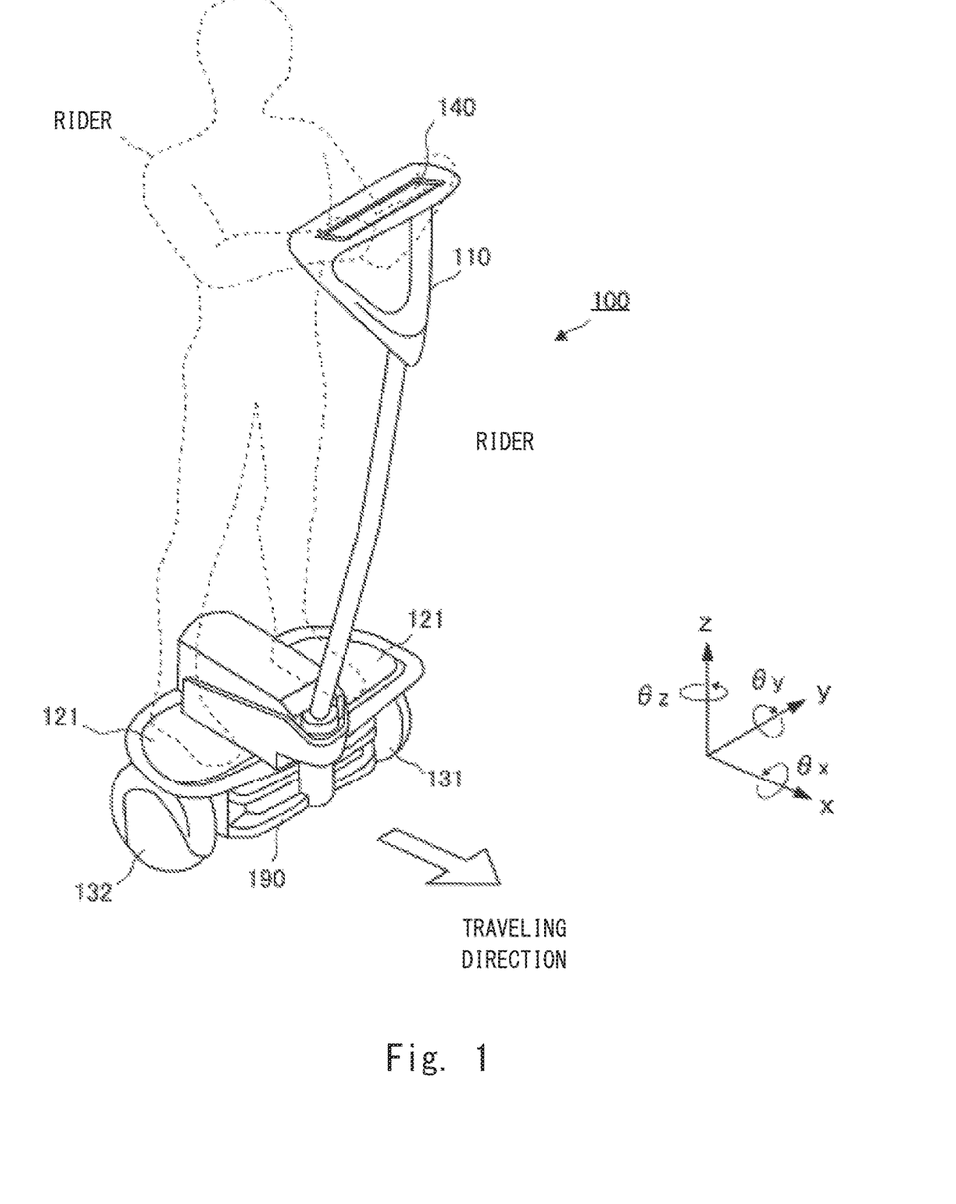
FIG. 1 is an appearance perspective view showing an inverted two-wheel vehicle according to an embodiment.

FIG. 1 is an appearance perspective view showing an inverted two-wheel vehicle 100 as an inverted pendulum type vehicle according to this embodiment. The inverted two-wheel vehicle 100 has a structure in which a base table 190 which forms an entire framework of the vehicle is provided with a handle 110, a boarding platform 121 extending in a right-left direction, and left and right wheels 131 and 132. The handle 110 is gripped by a rider and has a support function for allowing the rider to balance himself/herself. The handle 110 also serves as a support part that supports a display unit 140. The display unit 140 is composed of, for example, a liquid crystal panel, and presents various information to the rider.

It is assumed that the rider rides in a standing position on the inverted two-wheel vehicle 100 according to this embodiment. The boarding platform 121 serves as a boarding part on which right and left feet of the rider are placed.

The boarding platform 121 may be fixed to the base table 190, or may be provided with a link mechanism that causes a mounting surface to be tilted in the right-left direction in accordance with a turning motion in the right-left direction.

The left-side wheel 131 is a drive wheel that is mounted so as to be displaced to the left side of the vehicle with respect to the center of the boarding platform 121 and is rotationally driven by a motor described later. The right-side wheel 132 is a drive wheel that is mounted so as to be displaced to the right side of the vehicle with respect to the center of the boarding platform 121 and is rotationally driven by a motor described later. The left-side wheel 131 and the right-side wheel 132 are disposed coaxially parallel to each other. Accordingly, when the left-side wheel 131 and the right-side wheel 132 are rotated at the same speed in the same direction, the vehicle travels straight, and when the left-side wheel 131 and the right-side wheel 132 are rotated at different speeds, the vehicle turns to the right or left.

The inverted two-wheel vehicle 100 according to this embodiment is a coaxial two-wheel vehicle that controls the rotation of each of the wheels 131 and 132, which are drive wheels, based on an inverted pendulum posture control model. A control unit described later detects the overall posture of the inverted two-wheel vehicle 100 on which the rider rides, and controls the wheels 131 and 132 to be rotationally driven so as to stably maintain the state in which the rider rides on the vehicle. Through this control, the rider shifts his/her center of gravity of the rider in a direction in which the rider intends to travel, thereby allowing the inverted two-wheel vehicle 100 to travel in the direction. When the center of gravity of the rider is shifted forward, the vehicle moves forward, and when the center of gravity of the rider is shifted backward, the vehicle moves backward. When the center of gravity of the rider is shifted rightward, the vehicle turns to the right, and when the center of gravity of the rider is shifted leftward, the vehicle turns to the left.

The inverted two-wheel vehicle 100 according to this embodiment is a device having a rehabilitation function for a patient having a disability in a foot joint at his/her ankle to restore the ankle function. The inverted two-wheel vehicle 100 can apply a load to the ankle of the patent to such an extent that a rehabilitation effect can be expected, when the patient continuously rides on the inverted two-wheel vehicle 100 while the rider balances himself/herself. The load is a load corresponding to an ankle torque that is generated at each ankle by the patient. When the magnitude of the ankle torque is substantially appropriate for the patient, the rehabilitation effect can be expected. The inverted two-wheel vehicle 100 according to this embodiment has a function of quantitatively presenting the ankle torque generated by the rider.

Note that the inverted two-wheel vehicle 100 can be used not only for performing rehabilitation, but also as a travel device for traveling to a destination. When the inverted two-wheel vehicle 100 is used as the travel device, not only a patient having a disability in his/her ankle, but also an able-bodied person can use the inverted two-wheel vehicle 100. When a normal mode in which the inverted two-wheel vehicle 100 is used as the travel device is selected, the inverted two-wheel vehicle 100 can turn in the right-left direction. When a training mode for performing rehabilitation is selected, the inverted two-wheel vehicle 100 is inhibited from being driven to turn in the right-left direction. The following description is made assuming that a patient having a disability in his/her ankle rides on the vehicle as a rider.

As shown in the drawings, in the coordinate system of the inverted two-wheel vehicle 100, a forward movement direction orthogonal to an axle direction connecting both wheels is defined as an x-axis positive direction; a direction approaching the wheel 131 in the axle direction connecting both wheels is defined as a y-axis positive direction; a direction that is orthogonal to each of the x-axis and the y-axis and approaches the head of the rider is defined as a z-axis positive direction. Further, θx (roll-axis), θy (pitch-axis), and θz (yaw-axis) are determined in such a manner that a clockwise direction with respect to an orthogonal axis of each of the roll-axis, the pitch-axis, and the yaw-axis is defined as a positive direction.

Figure 2:
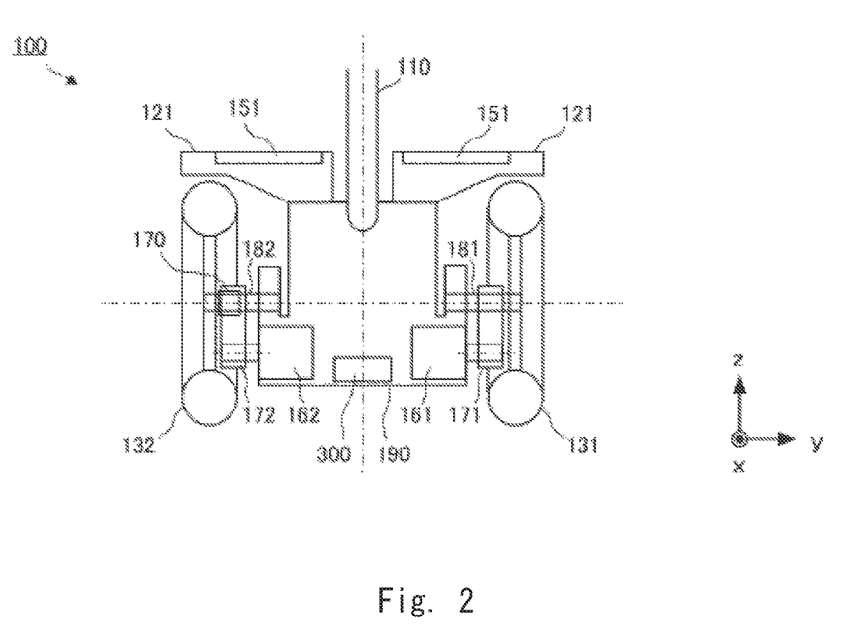
FIG. 2 is a schematic diagram showing a main structure of the inverted two-wheel vehicle.

FIG. 2 is a schematic diagram showing a main structure of the inverted two-wheel vehicle 100. Specifically, FIG. 2 schematically shows a state where a section of a yz plane is observed from the positive side of the x-axis.

The two left and right wheels 131 and 132 are rotationally and pivotally supported by the base table 190 so that axles 181 and 182 of the left and right wheels 131 and 132, respectively, are aligned. A motor 161 for driving the left wheel 131 and a motor 162 for driving the right wheel 132 are each fixed to the base table 190. The driving force of the motor 161 is transmitted to the axle 181 through a transfer mechanism 171, which also serves as a reduction gear, to thereby rotationally drive the wheel 131. The driving force of the motor 162 is transmitted to the axle 182 through a transfer mechanism 172, which also serves as a reduction gear, to thereby rotationally drive the wheel 132. Specifically, the wheels 131 and 132 are controlled to be rotationally driven by the motors 161 and 162, which are independent of each other, and the transfer mechanisms 171 and 172, respectively.

The axle 182 is provided with a torque sensor 170. The torque sensor 170 detects a motor torque that is output to the wheel 132 from the motor 162. The torque sensor 170 is a sensor that employs a system in which, for example, a strain gauge is attached to a shaft and a torsional deformation of the shaft is detected. In the inverted two-wheel vehicle 100 according to this embodiment, the axle 182 is provided with the torque sensor 170 and the axle 181 is not provided with the torque sensor 170. However, in order to enhance the detection accuracy, the axle 181 may also be provided with the torque sensor 170. When both the axes are provided with the torque sensor 170, the motor torque, which is described later, may be calculated by averaging outputs form the two torque sensors. Depending on the accuracy of the motor torque to be detected, a current value of power to be supplied to the motors 161 and 162 may be detected and the current value may be converted into a motor torque, instead of providing the torque sensor 170.

The load sensor 151 is a load sensor buried in the boarding platform 121, and detects that the foot of the rider is placed on the boarding part. The load sensor 151 is, for example, a mechanical switch that is closed when the load sensor is pressurized.

A battery 300 is, for example, a secondary battery using a lithium ion battery, and supplies power to the motors 161 and 162 and the like through a transformation circuit or the like. The secondary battery can be charged with, for example, a household AC power supply, and may have a detachable structure.

Figure 3:
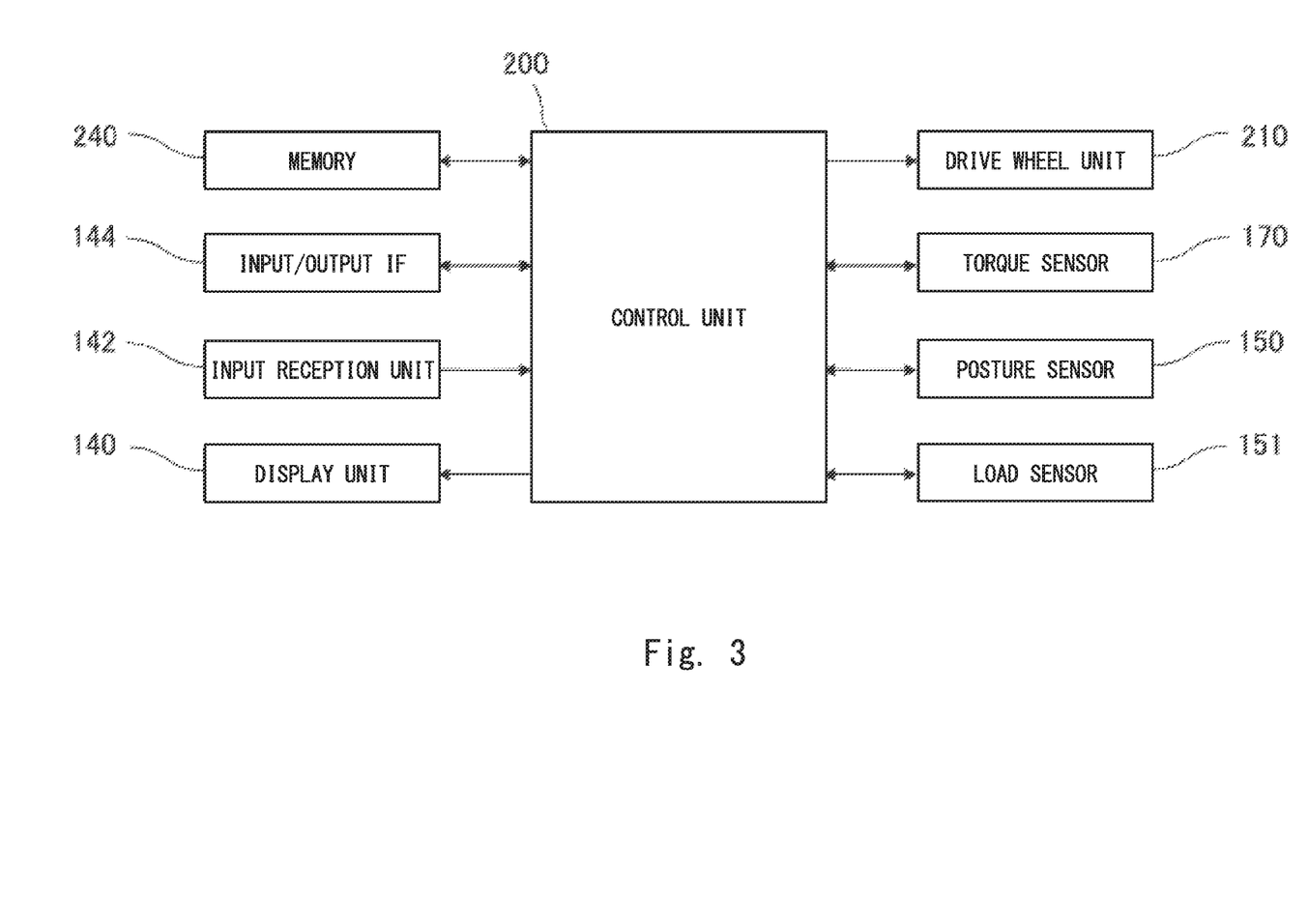
FIG. 3 is a control block diagram of the inverted two-wheel vehicle.

FIG. 3 is a control block diagram of the inverted two-wheel vehicle 100. A control unit 200 is, for example, a CPU, and is provided in the base table 190. The control unit 200 controls the components of the inverted two-wheel vehicle 100 in an integrated manner. A drive wheel unit 210 includes drive circuits or the motors 161 and 162 for driving the wheels 131 and 132. The control unit 200 controls the rotation of each of the wheels 131 and 132 by transmitting a drive signal to the drive wheel unit 210.

The torque sensor 170 transmits a detection signal to the control unit 200 in response to a request signal from the control unit 200. The control unit 200 calculates, from the detection signal, the motor torque of the motor 162 that is output to the wheel 132 so that the inverted two-wheel vehicle 100 can maintain the inverted state. In other words, the torque sensor 170 cooperates with the control unit 200 and serves as a detection unit that detects the drive torque of each drive wheel so that the inverted two-wheel vehicle 100 can maintain the inverted state.

A posture sensor 150 includes an acceleration sensor and a gyroscopic sensor, and transmits detection signals to the control unit 200 in response to a request signal from the control unit 200. The control unit 200 recognizes the inverted state of the inverted two-wheel vehicle 100 based on the detection signals, generates a drive signal necessary for maintaining the inverted state, and transmits the generated drive signal to the drive wheel unit 210.

The load sensor 151 transmits a detection signal to the control unit 200 in response to a request signal from the control unit 200. Upon receiving the detection signal, the control unit 200 recognizes that the rider rides on the vehicle, and starts to control the posture of the inverted pendulum.

The display unit 140 displays various information to be presented to the rider in accordance with a display signal from the control unit 200. When the rider selects the training mode for performing rehabilitation, the display unit 140 displays menu items for training and the progress of the training, as well as the torque information about the ankle torque of the rider that is calculated by the control unit 200. In other words, the display unit 140 cooperates with the control unit 200 and serves as an output unit that outputs the torque information detected by the detection unit.

An input reception unit 142 includes operation members operated by the rider, such as a touch panel which is superimposed on, for example, the liquid crystal panel of the display unit 140, and switches provided on the handle 110. The input reception unit 142 receives an input operation by the rider and transmits an input signal to the control unit 200. The rider provides the control unit 200 with, for example, a mode selection and initial input parameters, which are described later, via the input reception unit 142. In other words, the input reception unit 142 cooperates with the control unit 200 and serves as an acquisition unit that acquires information or instructions from the user. Further, when the control unit 200 receives the selection of an active mode or a passive mode to be described later from the rider via the input reception unit 142, the control unit 200 switches the mode in accordance with the selection. In this case, the input reception unit 142 serves as a switching unit that switches the active mode and the passive mode in cooperation with the control unit 200.

An input/output IF 144 includes an input interface for inputting information from an external device, and an output interface for outputting information to the external device. The input/output IF 144 is, for example, a wireless LAN or a USB. When the control unit 200 outputs the torque information to the external device, the control unit 200 outputs the torque information via the input/output IF 144. In this case, the input/output IF 144 cooperates with the control unit 200 and serves as an output unit that outputs the torque information. Further, the control unit 200 can receive the initial input parameters and the like from the external device via the input/output IF 144. In this case, the input/output IF 144 cooperates with the control unit 200 and serves as an acquisition unit that acquires information about the rider.

A series of control programs are preliminarily stored in a memory 240, and the control unit 200 loads the control programs from the memory 240 at the time of start-up and executes various control operations. The memory 240 is a non-volatile recording medium. For example, a solid state drive is used as the memory 240. The memory 240 stores not only the control programs, but also various parameter values, functions, look-up tables, and the like used for the control operations.

Figure 4:
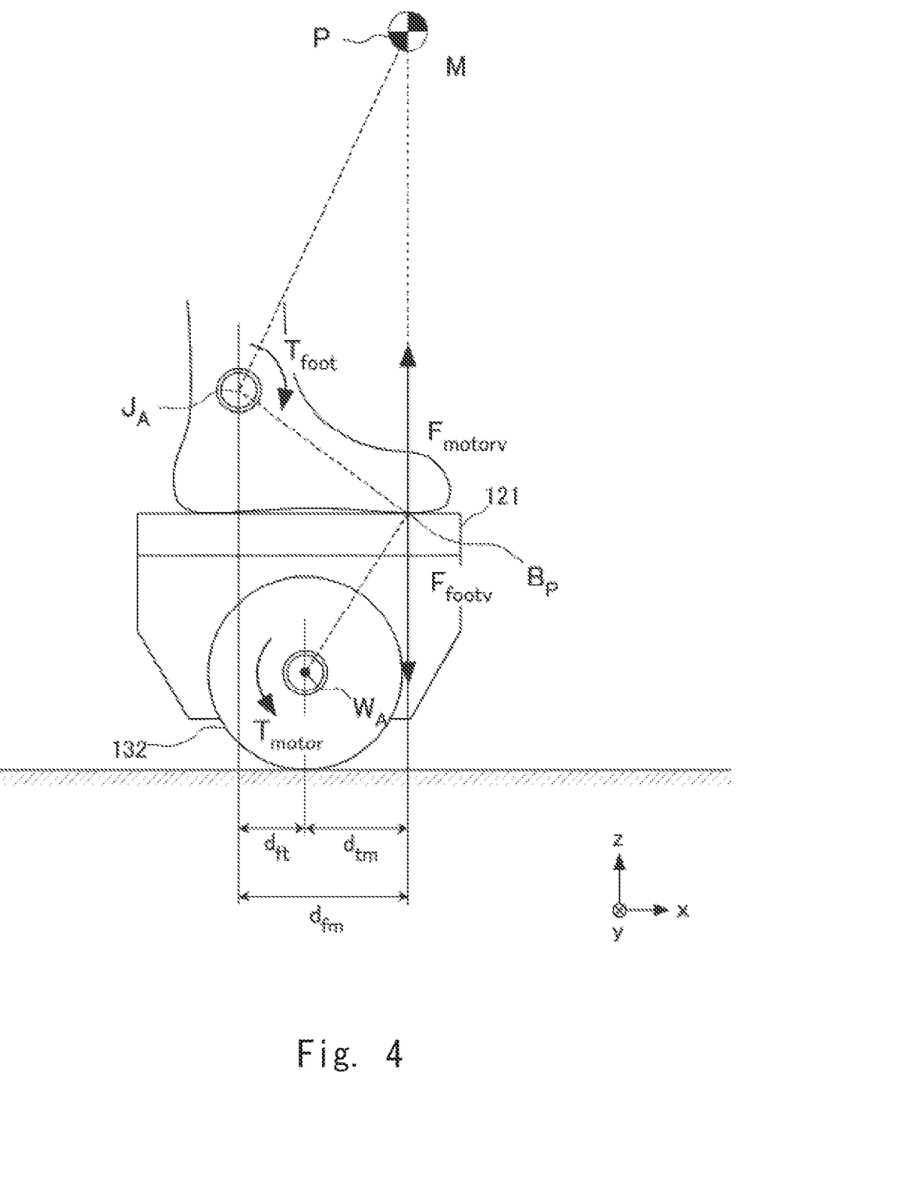
FIG. 4 is an explanatory diagram for explaining a principle of detecting an ankle torque.

Next, a principle of detecting the ankle torque of the rider using the detected motor torque will be described. FIG. 4 is an explanatory diagram for explaining the principle of detecting the ankle torque. FIG. 4 shows, in a simplified manner, a state where the wheel 132 which is coupled to the torque sensor 170 and the boarding platform 121 on which the right foot of the rider is placed are observed from the rise side with respect to a traveling direction.

As shown in the drawings, the rotation center position of the wheel 132 is represented by $W_A$; the center position of the ankle of the right foot is represented by $J_A$; the overall center-of-gravity position of the rider and the inverted two-wheel vehicle 100 is represented by P; and the foot perpendicular to a boarding surface from the position P is represented by $B_P$. The overall mass of the rider and the inverted two-wheel vehicle 100 is represented by M; the ankle torque is represented by $T_{foot}$; and the motor torque is represented by $T_{motor}$. A distance from $J_A$ to $B_P$ in the x-axis direction is represented by $d_{fm}$; a distance from $J_A$ to $W_A$ is represented by $d_{fi}$; and a distance from $W_A$ to $B_P$ is represented by $d_{tm}$.

In this case, a force $F_{motorv}$ in the perpendicular direction that is generated by the motor at $B_P$ and a force $F_{footv}$ in the perpendicular direction that is generated at the ankle are balanced, and the following expression holds.

$$F_{motorv} = F_{footv} \quad (1)$$

When this expression is replaced by a torque relation expression, the following expression holds.

$$T_{foot}/d_{fm} = T_{motor}/d_{tm} \quad (2)$$

Accordingly, the response variable $T_{foot}$ is represented by the following expression.

$$T_{foot} = T_{motor} \cdot d_{fm}/d_{tm} \quad (3)$$

Further, the distance relation in the x-axis direction is represented by the following expression.

$$d_{fm} = d_{fi} + d_{tm} \quad (4)$$

When this expression is substituted into the Expression (3), the following expression holds.

$$T_{foot} = T_{motor} \cdot (d_{fi}/d_{tm} + 1) \quad (5)$$

In this expression, $d_{tm}$ represents the distance from $W_A$ to $B_P$ in the z-axis direction, and thus the following expression holds.

$$d_{fm} = T_{motor}/(Mg) \quad (6)$$

where g represents a gravitational acceleration. By using Expression (5), the following expression can be solved.

$$T_{foot} = Mg \cdot d_{fi} + T_{motor} \quad (7)$$

$Mg \cdot d_{fi}$ included in the first term on the right-hand side of Expression (7) includes unique information about the rider.

Specifically, the information indicates the mass of the rider and the ankle center position $J_A$. In a simple way, these assumed values can be set from a standard human body model. For example, when the weight of the rider is 60 kg, "M" can be calculated because the mass of the inverted two-wheel vehicle 100 is known. Assume that the standard value for the foot length is 26 cm. Statistically, the ankle position $J_A$ is located at a position that is 22% from an end of a heel of a person with respect to the foot length, and the neutral position of the human body is located at a position that is 45% from the end of the heel. Considering that, in a static state, the rider rides the vehicle in such a manner that the neutral position of the human body is located on the axle of the vehicle, $d_{ft}=26\times(0.45-0.22)=5.98$ cm can be set. The use of such assumed values makes it possible to calculate the first term in a simple manner.

Further, when at least one of the weight of the rider and the size of the foot of the rider as an initial input parameter is acquired through the input reception unit 142 and the input/output IF 144, the first term can be calculated more accurately. Instead of inputting values by the rider, for example, if the load sensor 151 can measure the weight of the rider or the foot length of the rider, these values can be automatically acquired when the rider rides on the boarding platform 121.

Accordingly, the first term on the right-hand side of Expression (7) can be considered to be a fixed value determined when the rider rides on the boarding platform 121. On the other hand, $T_{motor}$ in the second term on the right-hand side of Expression (7) represents a value that fluctuates from moment to moment during a period in which the inverted two-wheel vehicle 100 performs inversion control. This value can be tracked by monitoring the output of the torque sensor 170. In other words, a fluctuation component of the ankle torque $T_{foot}$ is a component of the motor torque $T_{motor}$. Accordingly, a variation with time of the ankle torque $T_{foot}$ that is calculated and output by the control unit 200 is correlated to a variation with time of the motor torque $T_{motor}$.

From the relationship described above, in the case of outputting the variation with time as the torque information about the ankle torque, only the second term may be output. In the case of outputting the actual value of the ankle torque in a simple way, an assumed value may be added to the motor torque $T_{motor}$ to be output. In the case of outputting a more accurate value, the information may be output in view of unique information about the rider. In any one of the cases, the control unit 200 calculates the motor torque $T_{motor}$ from the output of the torque sensor 170 and generates the torque information about the ankle. In other words, the ankle torque is estimated based on the motor torque $T_{motor}$.

According to the device that estimates the ankle torque based on the principle as described above, it is possible to objectively comprehend a motion load on the ankles of a patient without the patient having to take the time and use the labor to put on a special device, such as a sensor for measuring the muscle force of the patient who performs training, in advance, like in the related art. Further, since the ankle torque of the patient riding on the vehicle can be quantitatively observed substantially in real time, training in which a training time, a target load amount, and the like are dynamically adjusted in accordance with the status of the achievement of the patient can be performed.

Note that an acceleration in the horizontal direction (x-axis direction) is not taken into consideration in the above-mentioned Expressions (1) to (7). In other words, in a state where the inverted two-wheel vehicle 100 moves with an acceleration in the horizontal direction, Expression (7) lacks in accuracy. However, in the actual control, control of a movement with a sudden acceleration is less likely to be performed in terms of safety of the rider. Accordingly, the effect of the acceleration component in the horizontal direction on Expression (7) is relatively small. Therefore, in practice, the torque information generated based on Expression (7) is sufficient. However, in the case of performing the torque estimation with a higher accuracy, the torque may be calculated using the output of the torque sensor 170 when the inverted two-wheel vehicle 100 causes no acceleration in the horizontal direction.

Similarly, in order to eliminate effects on the angular acceleration about the z-axis during turning, the torque may be calculated using the output of the torque sensor 170 when the inverted two-wheel vehicle 100 is not turning. Note that in the training mode described below, the turning movement of the vehicle is inhibited, so that the torque information output during the training mode has no effect on the angular acceleration about the z-axis.

Figure 5:
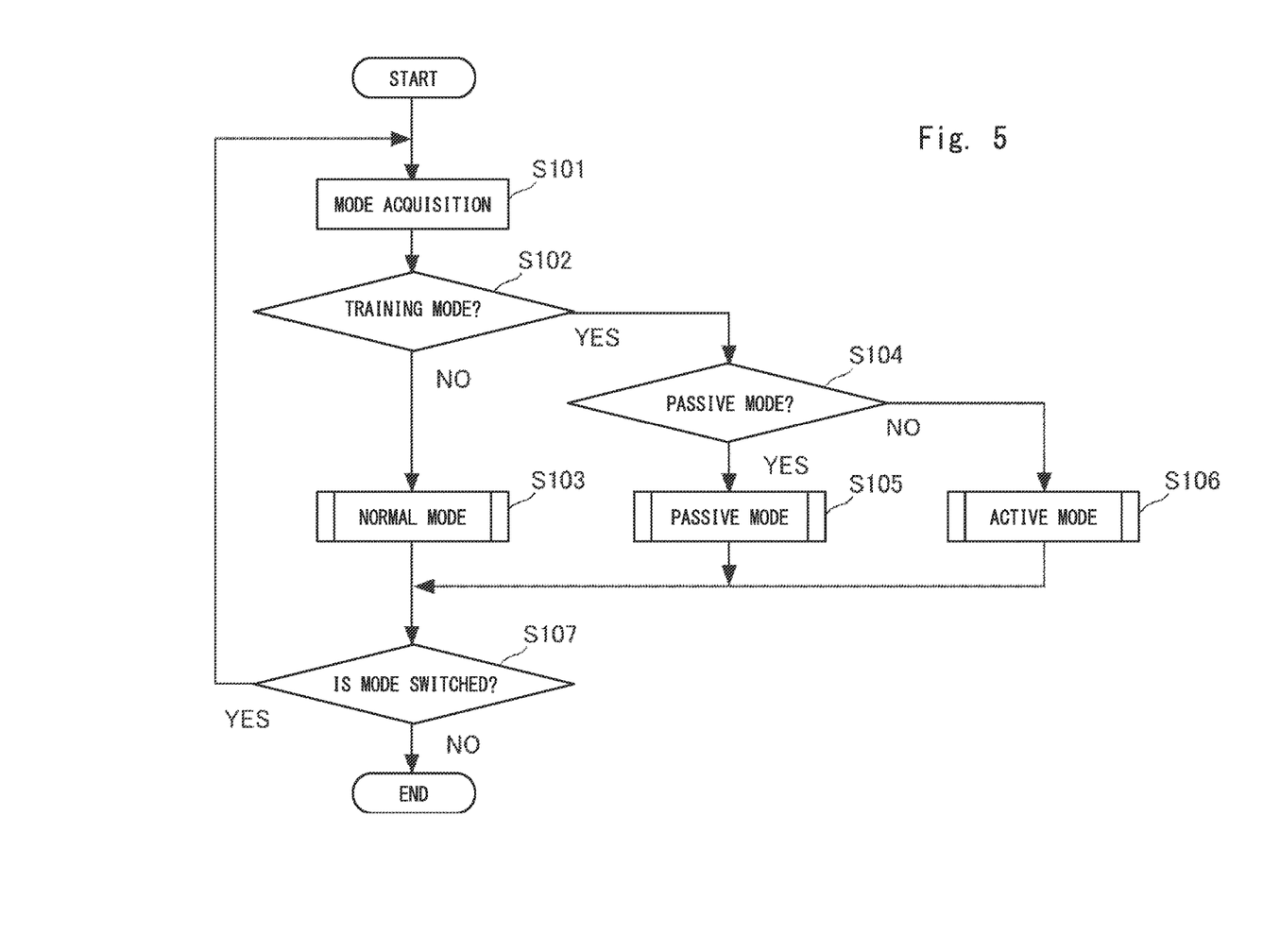
FIG. 5 is a flowchart showing an overall control flow of the inverted two-wheel vehicle.

Next, the overall control operation of the inverted two-wheel vehicle 100 will be described. FIG. 5 is a flowchart showing the overall control flow of the inverted two-wheel vehicle 100. The inverted two-wheel vehicle 100 executes a control program read out from the memory 240 in accordance with the mode selected by the rider.

When the power is turned on and a series of processes are started, the control unit 200 acquires the mode in which the rider sends an instruction via the input reception unit 142 in step S101. Then, in step S102, it is determined whether or not the acquired mode is the training mode for performing rehabilitation. When it is determined that the acquired mode is not the training mode, the control unit 200 proceeds to step S103 and starts control in the normal mode in which the inverted two-wheel vehicle 100 is used as a travel device. In the normal mode, the control unit 200 performs forward movement, backward movement, or turning as the rider shifts his/her weight. At this time, the torque information about the ankle torque may be displayed on the display unit 140.

When determining that the acquired mode is the training mode in step S102, the control unit 200 proceeds to step S104 and further determines whether or not the acquired mode is the passive mode in the training mode. When determining that the acquired mode is the passive mode, the control unit 200 proceeds to step S105 and executes a training program for the passive mode. On the other hand, when determining that the acquired mode is not the passive mode, the control unit 200 proceeds to step S106 and executes a training program for the active mode.

After completion of the control program in each mode, the control 200 proceeds to step S107 and determines whether or not the mode is switched within a predetermined period of time by the rider. When it is determined that the mode is switched, the process from step S101 is repeated. When it is determined that the mode is not switched, the series of processes are terminated.

Figure 6:
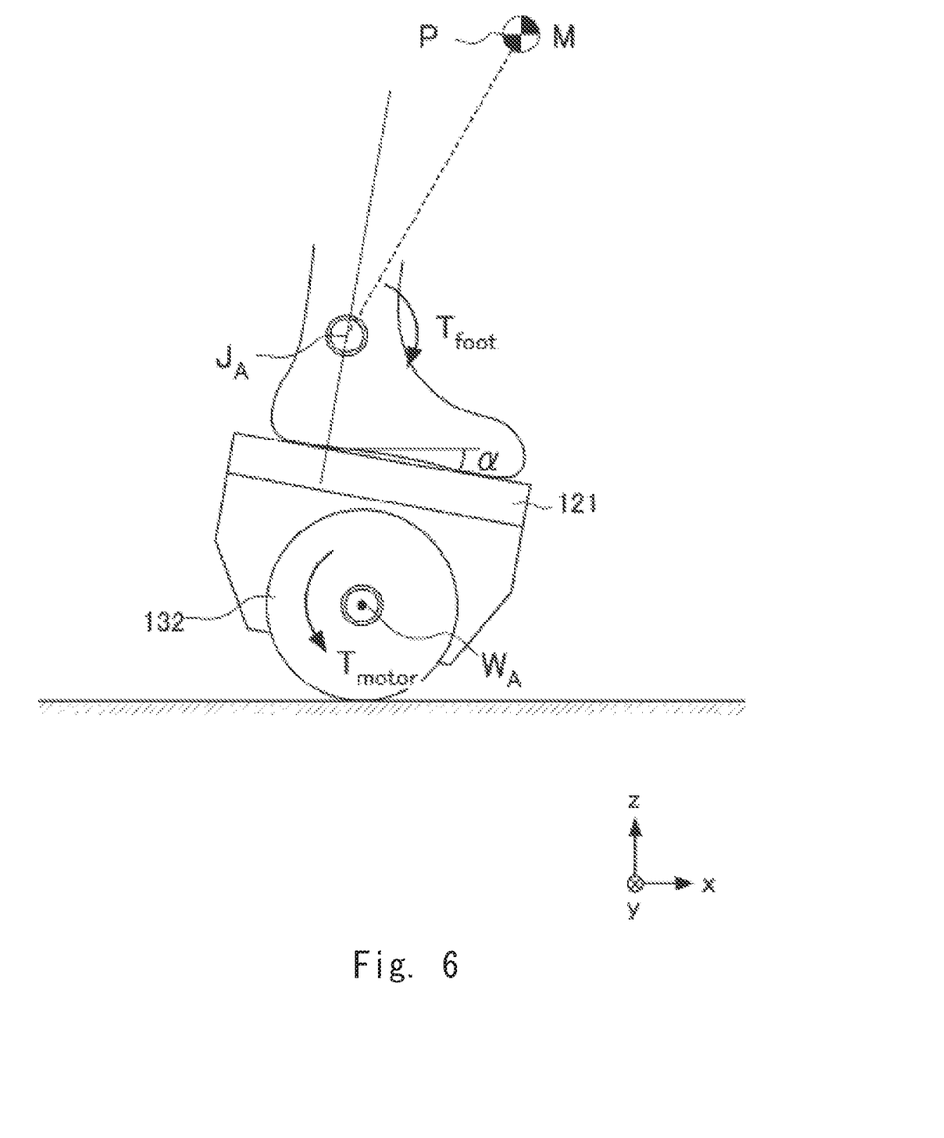
FIG. 6 is an explanatory diagram for explaining a trial control for training in a passive mode.

Next, the passive mode will be described. FIG. 6 is an explanatory diagram for explaining trial control for training in the passive mode. The passive mode is a mode in which a predetermined operation is automatically executed by the inverted two-wheel vehicle 100 without the need for the rider to intentionally provide some instruction. As long as the rider is standing on the boarding platform 121 while balancing himself/herself during the time, a certain training effect can be expected. In the passive mode, the control unit 200 causes a pseudo disturbance to make the inverted state unstable, thereby forcing the rider 121 to maintain the balance.

An example of the predetermined operation automatically executed by the inverted two-wheel vehicle 100 using a pseudo disturbance is an operation in which the boarding platform 121 repeats oscillation about the rotation center position $W_A$ of the wheel 132 while movements other than small movements in the front-back direction in association with the inverted pendulum control are stopped on the spot. For example, as shown in the drawings, the control unit 200 causes the boarding surface of the boarding platform 121 to be tilted forward by α degrees in the horizontal direction. Then, the rider adjusts the center-of-gravity position P in the font-back direction and plants his/her feet firmly on the boarding surface, or increases the ankle torque $T_{foot}$, to thereby balance himself/herself. When the tilt angle α is intermittently or continuously changed, the rider adjusts the magnitude of the ankle torque $T_{foot}$ in accordance with the change. Thus, the operation of intentionally making the inverted state unstable to cause the rider to actively balance himself/herself is effective as rehabilitation for recovering the ankle torque.

It is generally said that when the patient repeats the operation by exerting 40% or more of the muscle force of the patient at the time of training, a rehabilitation effect can be obtained. Accordingly, a criterion for the ankle torque with which the rehabilitation effect can be obtained may be set for each patient who rides the vehicle, and a maximum value $α_0$ for an angle of oscillation may be determined so as to generate the ankle torque that exceeds the criterion. The rider or the operator inputs the maximum value $α_0$ via the input reception unit 142 and the input/output IF 144.

The control unit 200 causes the boarding platform 121 to oscillate in accordance with the maximum value $α_0$ set as described above. In parallel with this operation, a detection signal is received from the torque sensor 170, and the ankle torque $T_{foot}$ is calculated and output to the display unit 140 and the like. After the ankle torque, which is a criterion, can be generated a number of times that exceeds a preset number of times, the control unit 200 outputs information indicating that the training is successful.

Figure 7:
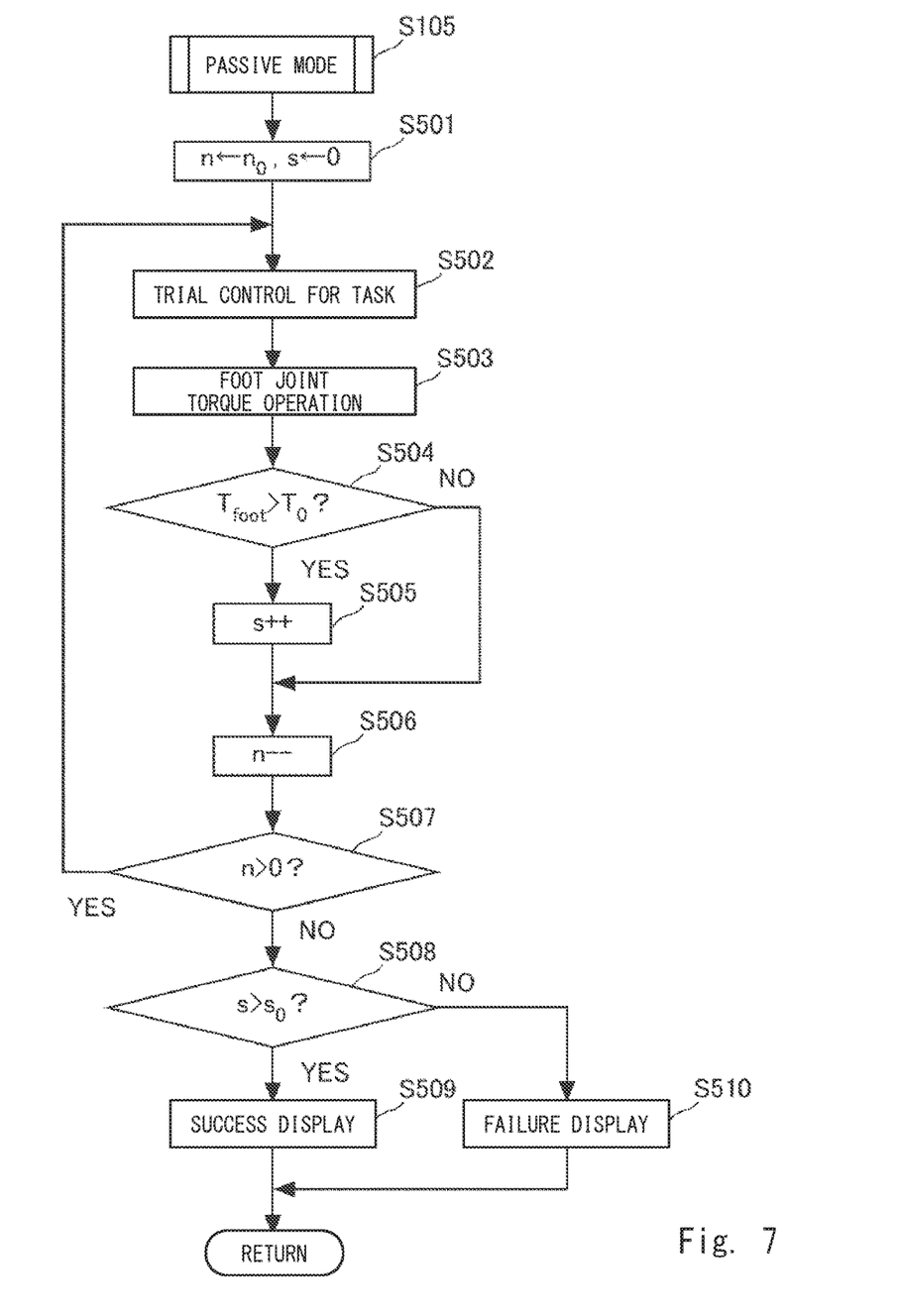
FIG. 7 is a flowchart showing a control flow in the passive mode.

FIG. 7 is a flowchart showing the control flow of the passive mode (step S105) illustrated as a sub-function in FIG. 5. When the passive mode is started (step S105), the control unit 200 repeatedly substitutes an initial value $n_0$ into a count variable n in step S501, and substitutes 0 into a success count variable s.

The control unit 200 proceeds to step S502 and starts trial control for a training task. Specifically, a trial for gradually tilting the boarding surface to the predetermined maximum value $α_0$ as described above above and returning the boarding surface to the original position in the horizontal direction is performed once. In parallel to this operation, the control unit 200 obtains the output of the torque sensor 170 and calculates the ankle torque $T_{foot}$ (step S503).

The control unit 200 proceeds to step S504 and determines whether or not the ankle torque $T_{foot}$ has exceeded a reference value $T_o$ during a time when the trial is performed once in step S502. When it is determined that the ankle torque has exceeded the reference value, the success count variable s is incremented (step S505), and the process proceeds to step S506. When it is determined that the ankle torque has not exceeded the reference value, the process proceeds to step S506 without incrementing the variable s.

The control unit 200 repeatedly decrements the count variable n in step S506. Further, in step S507, it is determined if the variable n has not reached "0". When it is determined that the variable n has not reached "0", the process returns to step S502 to repeat the trial control. When it is determined that the variable n has reached "0", the process proceeds to step S508.

In step S508, the control unit 200 determines whether or not the success count variable s has exceeded a reference number-of-times $s_0$. When it is determined that the success count variable s has exceeded the reference number-of-times $s_0$, the process proceeds to step S509 to determine that the current training is effective and a success display indicating a success is displayed on the display unit 140. When it is determined that the success count variable s has not exceeded the reference number-of-times $s_0$, the process proceeds to step S510 to determine that it cannot be expected that the current training is effective and a failure display indicating a failure is displayed on the display unit 140. After completion of the display, the passive mode is terminated and the process returns to the main flow.

In the passive mode described above, the maximum value $α_0$ for the angle of oscillation is determined in advance, and during this period, whether or not the ankle torque $T_{foot}$ has exceeded the reference value $T_o$ is observed. Alternatively, the boarding surface may be controlled to be tilted until the ankle torque $T_{foot}$ exceeds the reference value $T_o$. In this case, the control unit 200 functions as a tilt control unit that causes the boarding platform 121 to be tilted based on the calculated ankle torque $T_{foot}$ in cooperation with the drive wheel unit 210. Through this control, the training effect can be reliably obtained.

Figure 8:
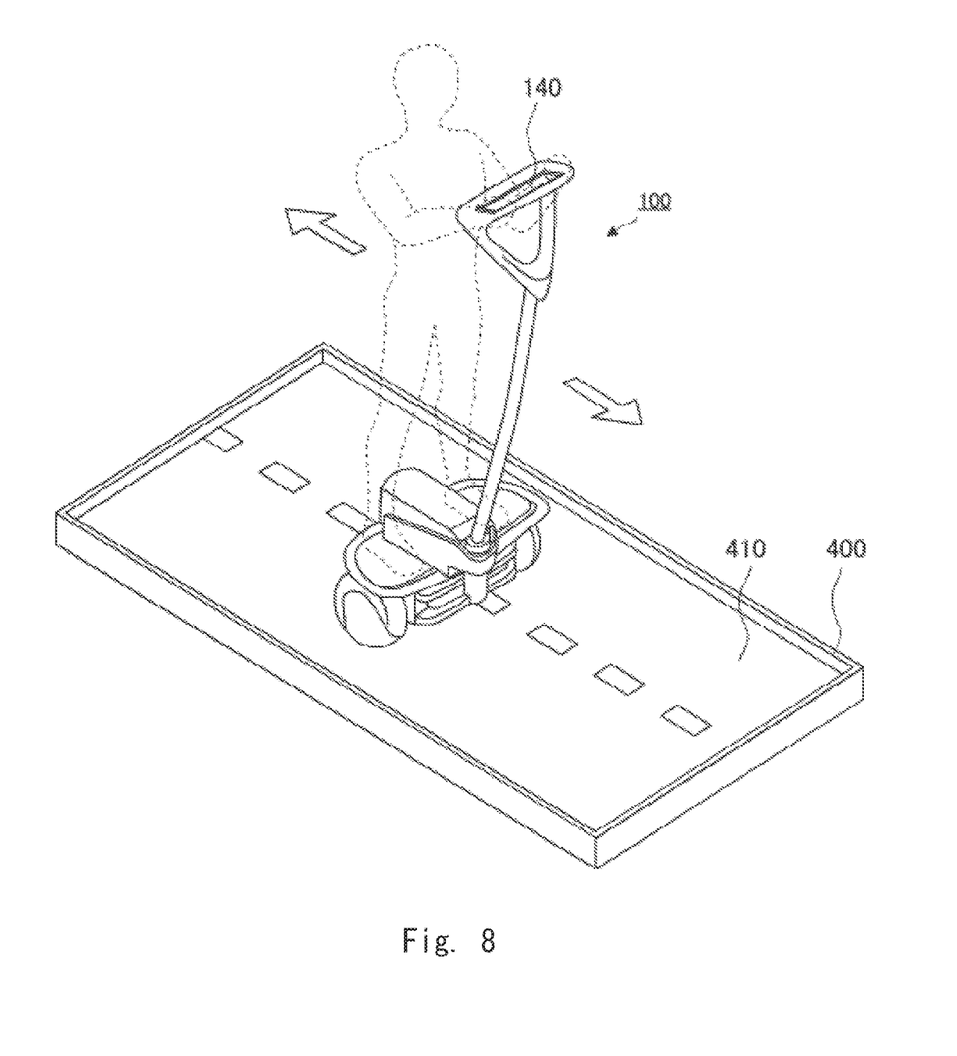
FIG. 8 is an appearance perspective view showing a state of training in an active mode.

Next, the active mode will be described. FIG. 8 is an appearance perspective view showing a state of training in the active mode. The active mode is a mode for moving the inverted two-wheel vehicle 100 in the front-back direction while the rider is balancing himself/herself. A training in which the ankle torque that exceeds the criterion within a predetermined period of time is repeatedly generated is performed.

The training unit 400 includes a surrounded travel surface 410. The travel surface 410 is about 1 m in the traveling direction, and the rider riding on the inverted two-wheel vehicle 100 repeatedly moves forward and backward in the travel surface. The training unit 400 may have, for example, an entertainment function which has a display and causes a background video to be displayed in accordance with the movement of the inverted two-wheel vehicle 100.

In the training for causing the travel surface to reciprocate in a limited range, in particular, when the movement of the vehicle is shifted from a forward movement to a backward movement, or from a backward movement to a forward movement, the rider plants his/her feet firmly on the boarding surface, or increases the ankle torque $T_{foot}$, to thereby balance himself/herself. This operation is effective as rehabilitation for recovering the ankle torque. The rider can perform training while confirming training progress information displayed on the display unit 140.

As mentioned above, it is generally said that when the patient repeats the operation by exerting 40% or more of the muscle force of the patient at the time of training, a rehabilitation effect can be obtained. Accordingly, also in the active mode, a reference value $T_0$ for the ankle torque with which the rehabilitation effect can be obtained is set for each patient who rides the vehicle. The rider or the operator inputs the reference value $T_0$ via the input reception unit 142 and the input/output IF 144.

The control unit 200 receives a detection signal from the torque sensor 170 while executing travel control for the forward movement and backward movement as the rider shifts his/her weight, and calculates the ankle torque $T_{foot}$ and outputs the calculated ankle torque to the display unit 140 and the like. After the reference value $T_0$ can be generated a number of times that exceeds a preset number of times within a predetermined time limit, the control unit 200 outputs information indicating that the training is successful.

Figure 9:
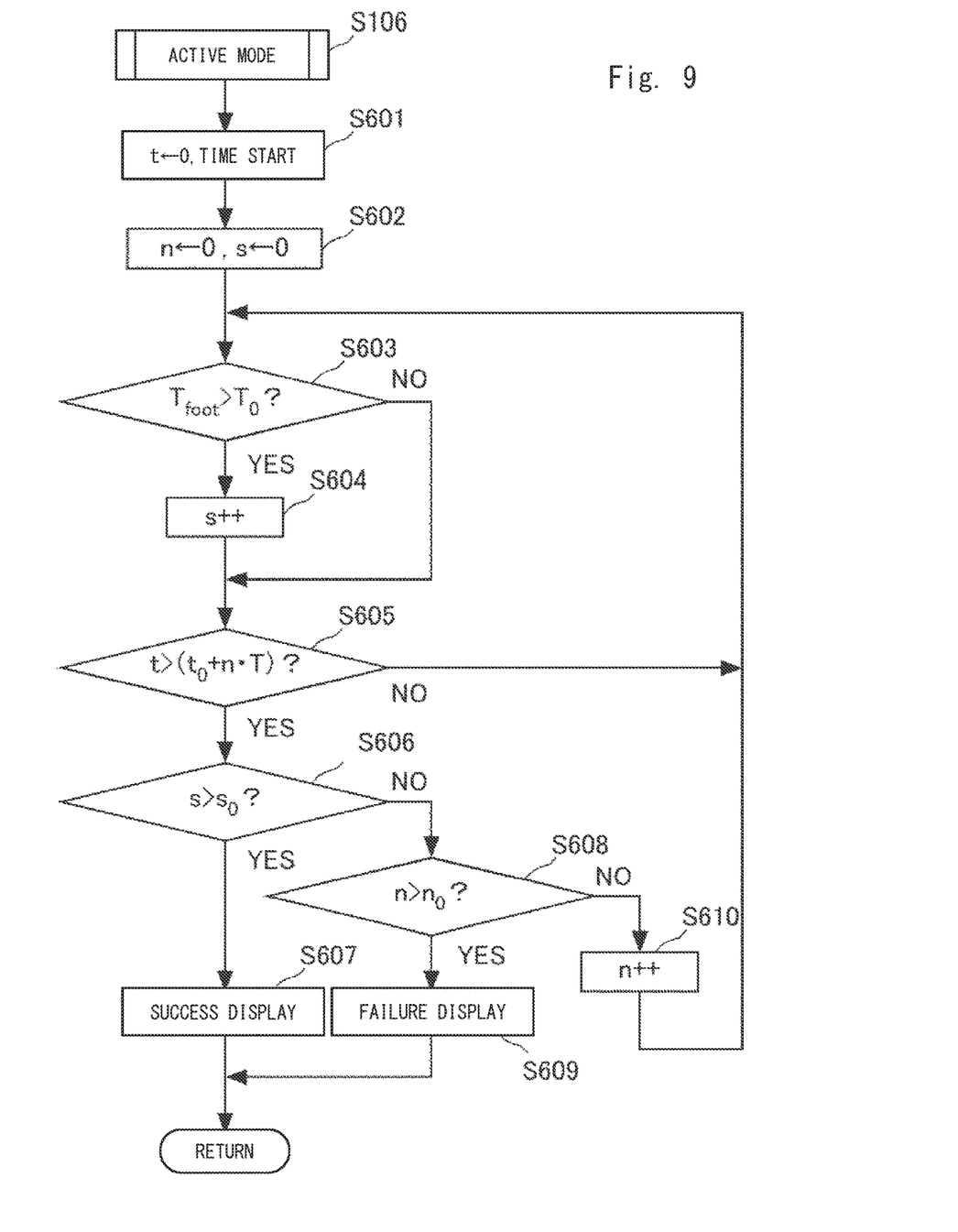
FIG. 9 is a flowchart showing a control flow in the active mode.

FIG. 9 is a flowchart showing a control flow for the active mode (step S106) illustrated as a sub-function in FIG. 5. When the active mode is started (step S106), the control unit 200 clears a timer t and starts measuring time in step S601. Further, in step S602, "0" is substituted into the extension count variable n and "0" is substituted into the success count variable s. After completion of these initialization processes, the control unit 200 starts the travel control for the forward movement or backward movement as the rider shifts his/her weight, and starts processing for calculating the ankle torque $T_{foot}$ from the output of the torque sensor 170. The rider confirms a "start" sign displayed when the control unit starts measuring time, and starts the movement operation of the forward or backward movement of the inverted two-wheel vehicle 100.

The control unit 200 monitors the calculated ankle torque $T_{foot}$ and determines whether or not $T_{foot}$ has exceeded the reference value $T_0$ (step S603). When it is determined that the ankle torque $T_{foot}$ has exceeded the reference value $T_0$, the success count variable s is incremented (step S604) and the process proceeds to step S605. When it is determined that the ankle torque $T_{foot}$ has not exceeded the reference value $T_0$, the process proceeds to step S605 without incrementing the variable s.

In step S605, the control unit 200 determines whether or not the timer t has exceeded a time limit $t_0$. When the extension count variable n is equal to or greater than 1, a time obtained by adding an extension time, which is obtained by multiplying a preliminarily set unit extension time T by n, to $t_0$ is set as a time limit. Within the time limit, the process returns to step S603. When the time limit is exceeded, the process proceeds to step S606.

In step S606, the control unit 200 determines whether or not the success count variable s has exceeded the reference number-of-times $s_0$. When determining that the success count variable has exceeded the reference number-of times $s_0$, the control unit 200 proceeds to step S607 to determine that it can be expected that the current training is effective and displays the success display indicating a success on the display unit 140. When determining that the success count variable has not exceeded the reference number-of-times $s_0$, the control unit 200 proceeds to step S608.

In step S608, the control unit 200 determines whether or not the extension count variable n has exceeded a predetermined upper-limit extension number-of times $n_0$. When determining that the extension count variable n has not exceeded the predetermined upper-limit extension number-of times $n_0$, the control unit 200 increments n in step S610 and returns to step S603. When determining that the extension count variable n has exceeded the predetermined upper-limit extension number-of times $n_0$, the control unit 200 proceeds to step S609 to determine that it cannot be expected that the current training is effective and displays the failure display indicating a failure on the display unit 140. After completion of the display in step S607 or S609, the active mode is terminated and the process returns to the main flow.

Figure 10:
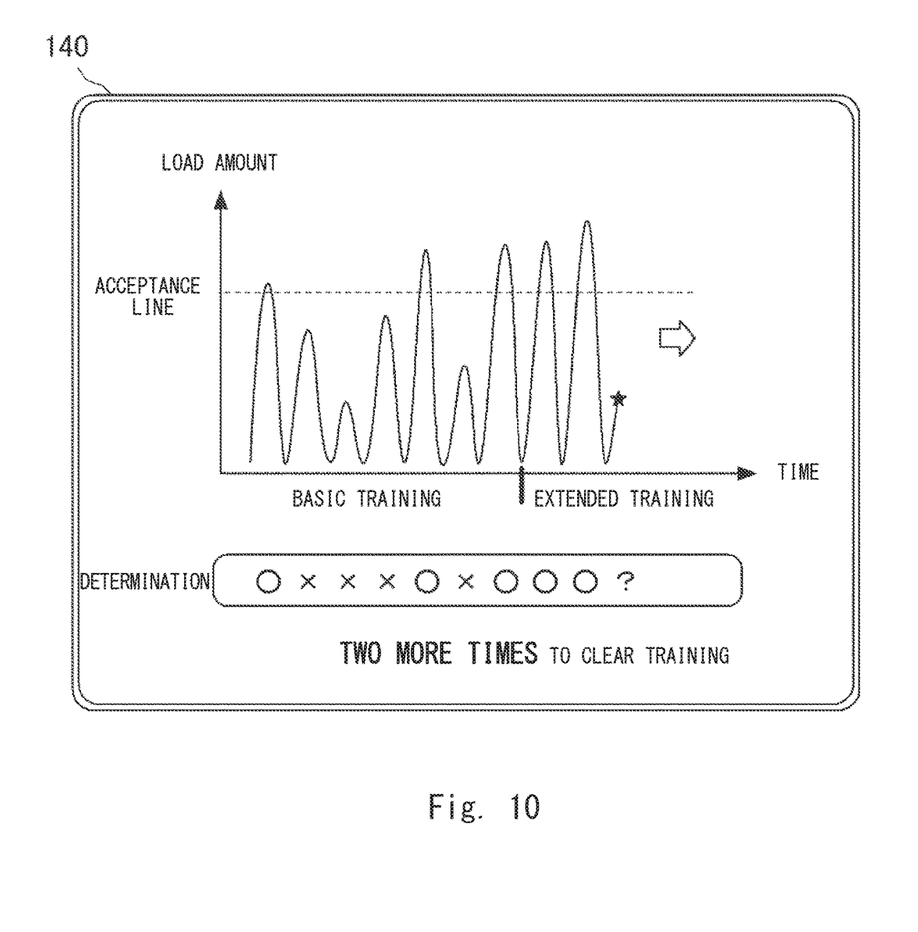
FIG. 10 is a diagram showing a display example in the active mode.

FIG. 10 is a diagram showing a display example of the display unit 140 when the active mode is executed. The graph continuously shows the ankle torque $T_{foot}$ as a load amount (vertical axis) with a lapse of time (horizontal axis). The ankle torque $T_{foot}$ obtained at the current time is marked with a star, and the overall waveform is scrolled leftward and the previous waveform is deleted from the left end. An acceptance line represents the reference value $T_0$. When the waveform exceeds the line, "○" is marked in a determination field. When the waveform does not reach the line, "×" is marked in the determination field. Below the time axis, training to be performed until the time limit $t_0$ is reached is represented as "basic training", and training that is extended is represented as "extended training". In addition, a remaining number of times until the reference number-of-times $s_0$ is reached is displayed.

The display information is not limited to that shown in the figure, and various pieces of information can be displayed. For example, load amounts may be integrated and displayed in a gauge format, and a message, such as "Take the plunge to put some muscle", may be displayed. Such a display allows the rider to confirm the training progress. Further, such a display contributes to an improvement in rider's motivation for training.

Figure 11:
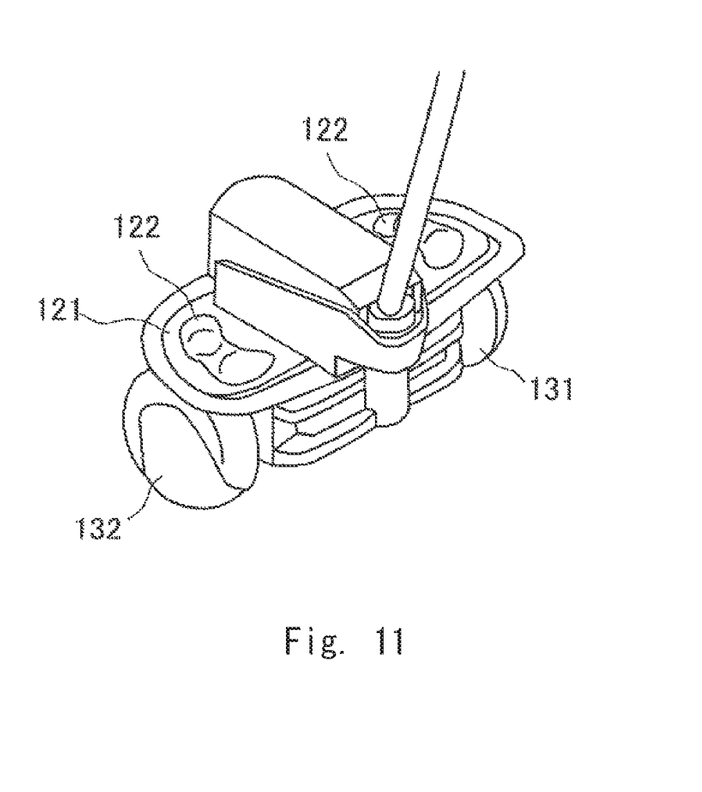
FIG. 11 is a partial enlarged view of an inverted two-wheel vehicle illustrated for a modified example of a boarding platform.

The embodiments have been described above assuming that the boarding surface of the boarding platform 121 is a flat surface. However, as described above, it is preferable that the neutral position of the body of the rider riding the vehicle in the static state be located on the axle of the vehicle. Accordingly, the boarding surface may be modified in some way to prompt the rider to ride the vehicle. FIG. 11 is a partial enlarged view of the inverted two-wheel vehicle 100 and illustrates a modified example of the boarding platform. In this modified example, the boarding surface of the boarding platform 121 is provided with concave-convex parts 122. Specifically, parts of each concave-convex part 122 that are located before and after an arch of a foot of the rider are dented to a large extent in such a manner that the arch of the foot is located on the axle of the corresponding one of the wheels 131 and 132. When the concave-convex parts 122 are provided, it can be expected that the ride can place the arch of each foot of the rider on a raised surface located between the dents that are located before and after the raised surface.

Further, instead of providing the concave-convex parts 122, an index indicating a foot mounting position recommended to the rider may be provided on the boarding surface of the boarding platform 121 together with the concave-convex parts. For example, a line indicating a heel position, or a circle indicating the position of the arch of each foot of the rider may be provided on the boarding surface.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An inverted pendulum vehicle including a drive wheel and a boarding part configured to support a rider in a standing position, the inverted pendulum vehicle comprising:
    a detection unit configured to detect a drive torque of the drive wheel to maintain an inverted state; and
    an output unit configured to generate torque information about an ankle torque based on the drive torque detected by the detection unit and output the generated torque information, the ankle torque being applied to the boarding part by the rider, wherein the output unit generates the torque information using the drive torque and at least one of a weight and a size of a foot of the rider, the weight and the size of the foot being preliminarily set as a fixed value.

2. An ankle torque estimation method for estimating an ankle torque of a rider riding on an inverted pendulum vehicle including a drive wheel and a boarding part configured to support the rider in a standing position, the ankle torque estimation method comprising:
   an acquisition step of acquiring at least one of a weight of the rider and a size of a foot of the rider;
   a detection step of detecting a drive torque of the drive wheel to maintain an inverted state; and
   a generation step of generating an estimated value of the ankle torque by converting the driving torque detected in the detection step using at least one of the weight and the size of the foot acquired by the acquisition step.

3. An ankle torque estimation method for estimating an ankle torque of a rider riding on an inverted pendulum vehicle including a drive wheel and a boarding part configured to support the rider in a standing position, the ankle torque estimation method comprising:
   a detection step of detecting a drive torque of the drive wheel to maintain an inverted state; and
   a generation step of generating an estimated value of the ankle torque by converting the driving torque detected in the detection step using at least one of a weight and a size of a foot of the rider, the weight and the size of the foot being preliminarily set as a fixed value.

4. An inverted pendulum vehicle including a drive wheel and a boarding part configured to support a rider in a standing position, the inverted pendulum vehicle comprising:
   a detection unit configured to detect a drive torque of the drive wheel to maintain an inverted state;
   an output unit configured to generate torque information about an ankle torque based on the drive torque detected by the detection unit and output the generated torque information, the ankle torque being applied to the boarding part by the rider; and
   an acquisition unit configured to acquire at least one of a weight of the rider and a size of a foot of the rider,
   wherein the output unit generates the torque information using the drive torque and at least one of the weight and the size of the foot acquired by the acquisition unit.

5. The inverted pendulum vehicle according to claim 4, further comprising a tilt control unit configured to cause the boarding part to be tilted based on the torque information output from the output unit.

6. The inverted pendulum vehicle according to claim 4, wherein the output unit generates the torque information based on the drive torque obtained when the inverted pendulum vehicle causes no acceleration in a horizontal direction.

7. The inverted pendulum vehicle according to claim 4, wherein the output unit generates the torque information based on the drive torque obtained when the inverted pendulum vehicle makes no turning movement.

8. The inverted pendulum vehicle according to claim 4 further comprising a presentation unit configured to count the number of times of estimation that the ankle torque has exceeded a predetermined threshold, based on the torque information output from the output unit, and present the counted number of times of estimation.

9. The inverted pendulum vehicle according to claim 4, wherein the boarding part includes an index indicating a foot mounting position recommended to the rider.

10. The inverted pendulum vehicle according to claim 4, wherein the boarding part has irregularities for prompting the rider to place his/her foot.

11. The inverted pendulum vehicle according to claim 4, further comprising a handle to be gripped by the rider.

12. The inverted pendulum vehicle according to claim 4, further comprising a switching unit configured to switch a training mode for training an ankle of the rider between an active mode and a passive mode, the active mode being a mode in which the vehicle travels in accordance with shifting of a center of gravity of the rider, the passive mode being a mode in which a pseudo disturbance is generated to make an inverted state unstable.

\* \* \* \* \*